United States Patent [19]
Nylund

[11] Patent Number: 5,219,517
[45] Date of Patent: Jun. 15, 1993

[54] FUEL ASSEMBLY FOR A BOILING WATER NUCLEAR REACTOR

[75] Inventor: Olov Nylund, Västeråas, Sweden

[73] Assignee: ABB Atom AB, Västeråas, Sweden

[21] Appl. No.: 935,337

[22] Filed: Aug. 27, 1992

Related U.S. Application Data

[63] Continuation of Ser. No. 624,354, Dec. 7, 1990, abandoned.

[30] Foreign Application Priority Data

Dec. 14, 1989 [SE] Sweden .................... 8904218

[51] Int. Cl.⁵ .................................................. G21C 1/04
[52] U.S. Cl. ...................................... 376/352; 376/313; 376/451
[58] Field of Search ............... 376/352, 313, 364, 280, 376/439, 438, 451; 976/DIG. 60, DIG. 71, DIG. 78, DIG. 264

[56] References Cited

U.S. PATENT DOCUMENTS

| | | | |
|---|---|---|---|
| 4,053,358 | 10/1977 | Pennell | 376/280 |
| 4,053,359 | 10/1977 | Pennell | 376/365 |
| 4,116,764 | 9/1978 | Jones | 376/280 |
| 4,610,838 | 9/1986 | Gasparro et al. | 376/248 |
| 4,678,627 | 7/1987 | Rylatt | 376/313 |
| 4,684,495 | 8/1987 | Wilson et al. | 376/352 |
| 4,781,884 | 11/1988 | Anthony | 376/352 |
| 4,849,161 | 7/1989 | Brown et al. | 376/439 |
| 4,919,883 | 4/1990 | Bryan | 376/352 |
| 5,030,412 | 7/1991 | Yates et al. | 376/352 |
| 5,100,611 | 3/1992 | Nylund | 376/352 |

*Primary Examiner*—Donald P. Walsh
*Assistant Examiner*—Meena Chelliah
*Attorney, Agent, or Firm*—Watson, Cole, Grindle & Watson

[57] ABSTRACT

A fuel assembly for a boiling water nuclear reactor contains a plurality of vertical fuel rods, which are arranged between a bottom tie plate and a top tie plate in a surrounding vertical casing part. At its lower end the casing part is connected to a bottom part which is provided with an inlet opening for water for conducting water in through the bottom tie plate, through the space between the fuel rods in the vertical casing part and out through the top tie plate. A debris catcher with a low flow resistance to water is provided below or above the bottom tie plate and at a distance from the bottom tie plate.

11 Claims, 5 Drawing Sheets

FUEL ASSEMBLY FOR A BOILING WATER NUCLEAR REACTOR

CROSS REFERENCE TO RELATED APPLICATION

This is a continuation of application Ser. No. 624,354, filed Dec. 7, 1990, now abandoned.

BACKGROUND OF THE INVENTION

The present invention relates to a fuel assembly for a boiling water nuclear reactor, which fuel assembly comprises a plurality of vertical fuel rods arranged between a bottom tie plate and a top tie plate in a surrounding casing part, the lower end of which is connected to a bottom part which is provided with an inlet opening for water for conducting water in through the bottom tie plate, through the space between the fuel rods in the vertical casing part, and out through the top tie plate.

Experience shows that, for example in connection with repair and service of a nuclear reactor, debris may enter, which debris then moves with the water which circulates through the reactor core. The debris may, for example, consist of metal chips (borings) formed in connection with repair of, for example, a steam separator, pieces of metal wire, or other foreign particles which have entered the system from outside. The debris may give rise to abrasion damage, which has serious consequences if the damage arises on parts which are particularly easily damaged, such as fuel rods.

To avoid damage of the above-mentioned kind in pressurized water reactors, it is known to provide the bottom tie plates which already exist below the fuel rod bundle with a large number of holes to enable each bottom tie plate, in addition to each normal function, to function as a debris catcher in the form of a strainer and prevent debris from reaching the fuel rod bundle with control rod guide tubes and spacers.

SUMMARY OF THE INVENTION

According to the present invention, which relates to a fuel assembly for a boiling water reactor, a debris catcher is arranged as a separate new unit below or above the bottom tie plate and at a distance from the bottom tie plate. By arranging the debris catcher in this way, it may be given a very low flow resistance and hence constitute a minimum obstacle to the desired flow. An advantage, if the debris catcher is located below the bottom tie plate, is that the flow, because of the distance to the bottom tie plate, has time to even itself out if some part of the debris catcher should become clogged. Another advantage in the stated case is that it is possible in a simple way to supplement already existing fuel assemblies with debris catchers.

According to a particularly advantageous embodiment of the invention, the debris catcher consists of a strainer, parallel to the bottom tie plate, preferably in the form of a strainer plate. If the strainer is arranged below the bottom tie plate, it has, in addition to the advantages mentioned above, the advantage of being capable of being inspected as well as being capable of being removed and cleaned without any problems. A strainer parallel to the bottom tie plate is preferably arranged with an edge zone in the form of a gap towards adjacent parts of the fuel assembly, preferably with lower relative flow resistance than in the strainer itself and provided with projections extending into the edge zone.

If the strainer is arranged above the bottom tie plate, it is preferably formed with holes for end plugs at the bottom of the fuel rods, the holes being larger than the cross section of the end plugs so that internal zones preferably with lower relative flow resistance than in the rest of the strainer exist around the end plugs, and further provided with projections which extend into the internal zones.

According to an additional embodiment, the debris catcher consists of a container which is arranged below the bottom tie plate and which has limiting walls, parallel to the bottom tie plate and provided with holes, and which contains a sparse stack of folded sheets.

According to other embodiments, the debris catcher is formed as unit common to four fuel assemblies. Four fuel assemblies of the same kind are then arranged adjacent to each other around a common channel for water and the bottom part if formed as a vertical tube with an upper conical portion, which is connected to the outwardly-facing bottom portions of the casing parts of the fuel assemblies. According to such an embodiment, the debris catcher may consist of a funnel-shaped strainer, arranged in the conical portion of the bottom part, with the narrower part of the funnel directed downwards. In such an embodiment the strainer may cover the entire cross section of the tube. In another embodiment of this type the strainer may be provided with an opening in the narrower part which takes up a considerable part of the cross section of the tube. In this latter case, guide vanes for the water for centrifugal effect are suitably arranged in the tube to prevent debris from passing through the opening on the narrower part of the funnel-shaped strainer. According to another embodiment with a common debris catcher for a unit of the kind described composed of four fuel assemblies, the debris catcher comprises a number of concentric sheet metal cones, arranged in the conical portion of the bottom part and provided at the upper end with an outwardly-directed, bent-down edge for catching debris.

The invention will be described in greater detail, by way of example, with reference to the accompanying drawings.

BRIEF DESCRIPTION OF THE DRAWINGS

FIG. 1 shows a vertical section through the line I—I in

FIG. 2 shows the same composed fuel assembly in a view perpendicular to a horizontal plate through the line II—II in FIG. 1;

DETAILED DESCRIPTION OF THE PREFERRED EMBODIMENTS

Figure 1:
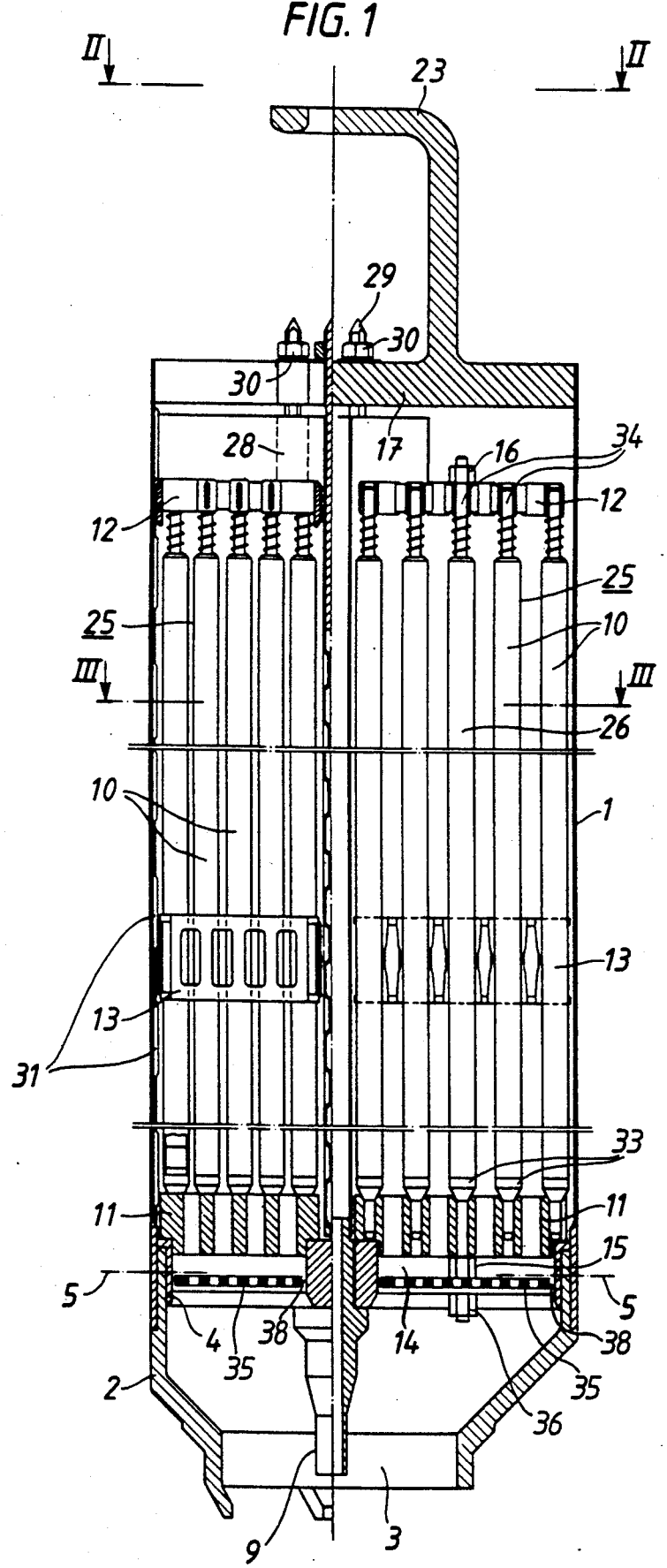
Figure 2:
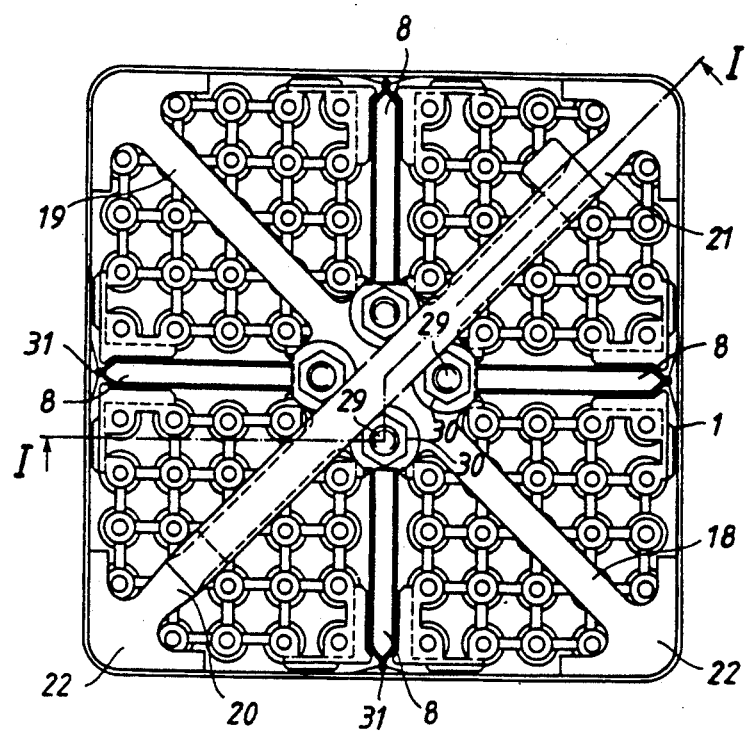
FIG. 2 of an embodiment of a composed fuel assembly composed of four fuel assemblies according to the invention with a debris catcher in the form of a strainer plate arranged below the bottom tie plate on each fuel assembly.
Figure 3:
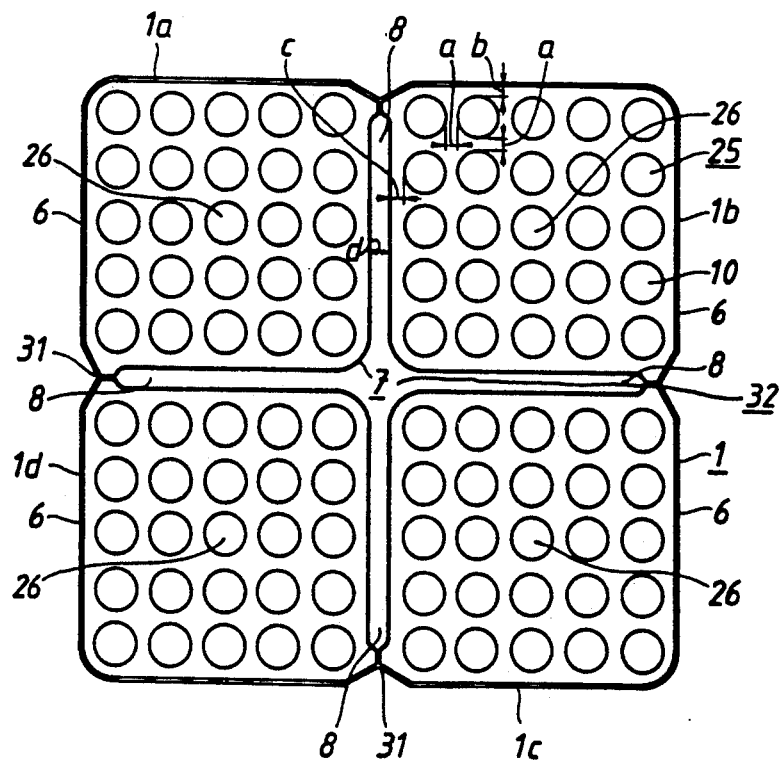
FIG. 3 shows a horizontal section through the line III—III in FIG. 1.

In FIGS. 1-3, 1 designates a fuel channel with substantially square cross section. The fuel channel surrounds, with no significant play, an upper square portion of a bottom part 2 with a circular, downwardly-facing inlet opening 3 for cooling water and moderator water. In addition to supporting the fuel channel 1, the bottom part 2 also supports a supporting plate 4. At the lower part the fuel channel 1 has a relatively thick wall portion which is fixed to the bottom part 2 and the supporting plate 4 by means of a plurality of horizontal bolts, indicated by means of dash-dotted lines 5. By means of a hollow support member 7 of cruciform cross section, the fuel channel 1 is divided into four vertical tubular parts 6 having at least substantially square cross section. The support member 7 is welded to the four walls 1a, 1b, 1c and 1d of the fuel channel 1 and has four hollow wings 8. The central channel formed by the support member is designated 32 and is connected at its lower part to an inlet tube 9 for moderator water. Each tubular part 6 contains a bundle 25 of twenty-five fuel rods 10. The rods are arranged in a symmetrical lattice in five rows each containing five rods. Each rod is included in two rows perpendicular to each other. Each bundle is arranged with a grid-like bottom tie plate 11, a grid-like top tie plate 12 and a plurality of spacers 13. A fuel rod bundle 25 with a bottom tie plate 11, a top tie 11, a top tie plate 12, spacers 13 and a casing part 6 forms a unit which in this application is referred to as a fuel assembly, whereas the device comprising four such fuel assemblies shown in FIGS. 1-3 is referred to as a composed fuel assembly. In the composed fuel assembly the four bottom tie plates 11 are supported by the supporting plate 4 and are partially each inserted into a corresponding square hole 14 therein. In each fuel assembly at least one of the fuel rods is provided with relatively long, threaded end plugs 33 and 34 of solid cladding material, the lower end plug 33 being passed through the bottom tie plate 11 and provided with a nut 15 and the upper end plug 34 being passed through the top tie plate 12 and provided with a nut 16. In the embodiment shown the centre rod 26 is formed in this way. This rod also serves as spacer holder rod. An upper end portion of the fuel channel 1 surrounds a cruciform lifting plate 17 with four horizontal arms 18, 19, 20 and 21, which extend from a common central portion. At the outer end each arm has an arrowhead-like portion 22, which in each respective corner of the fuel channel 1 makes contact with the inner wall surface of the fuel channel 1. A lifting handle 23 is fixed to the arms 20 and 21. The lifting plate 17 and the handle 23 together form a steel lifting member cast in one piece. The lifting plate 17 is fixed to the support member 7 by inserting four vertical bars 28 into respective wings 8 of the support member 7 and welding them thereto. At the upper end each bar 28 has a vertical, bolt-like portion 29 which is passed with a play through a corresponding hole in the mid-portion of the lifting plate 17 and provided with a nut 30. As will be clear from the figures, the fuel channel 1 is provided with indentations 31, intermittently arranged in the longitudinal direction, against which the support member 7 is welded.

Figure 4:
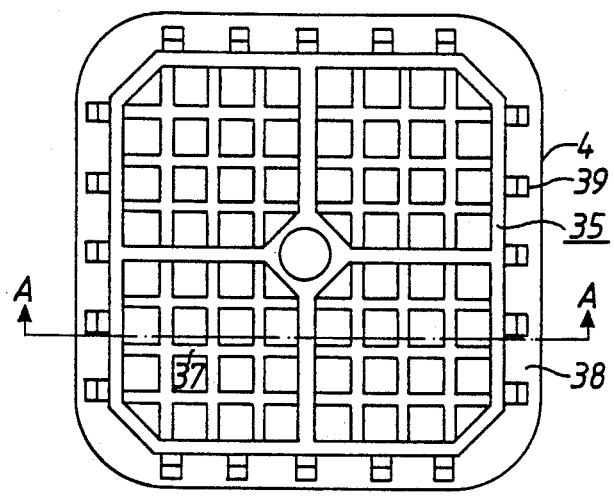
FIG. 4 is a view from below of a strainer plate in the device according to FIG. 1.
Figure 5:
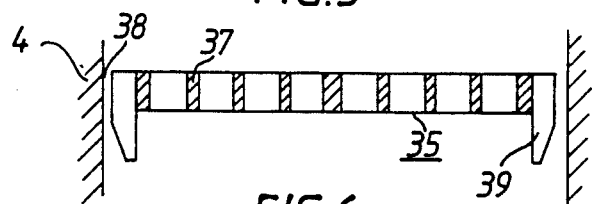
FIG. 5 is a vertical section of the same strainer plate through the line A—A in FIG. 4.

In accordance with the present invention, a debris catcher 35 in the form of a strainer plate is arranged below each bottom tie plate 11 and at a distance of at least 0.5 cm from the bottom tie plate in the composed fuel assembly shown in FIG. 1. The debris catcher is fixed with a nut 36 to the same end plug 33 as that on which the nut 15 is applied. In the exemplified case, as will be clear from FIGS. 4 and 5, the strainer plate is formed with bars 37 into a grid. Each square in the example has a size of 3×3 mm. Around the strainer plate, between the same and the supporting plate 4, there is arranged an edge zone in the form of a gap 38 with lower relative flow resistance than in the strainer plate itself. The strainer plate is provided with projections 39 extending into the edge zone. The strainer plate may be formed in many different ways, for example consist of sheet metal from which circular or elongated holes are punched out. It may also be formed in layers, suitably in the form of plates, with mutually displaced holes. Instead of a strainer plate, a strainer in the form of a wire netting may be used.

Figure 6:
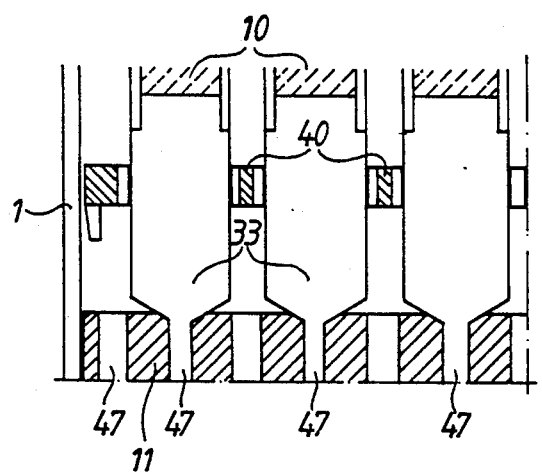
FIG. 6 is a vertical section of part of a fuel assembly with a strainer plate arranged above the bottom tie plate.
Figure 7:
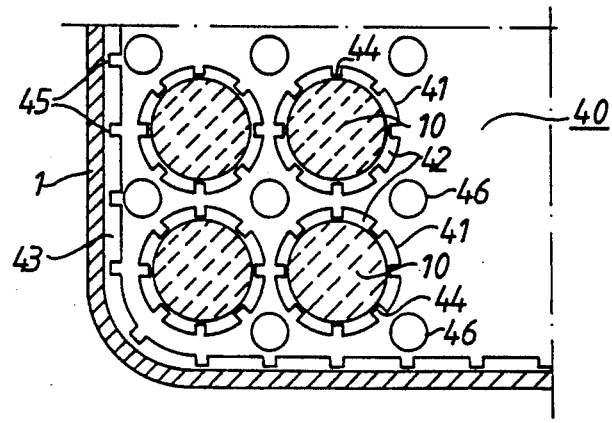
FIG. 7 is a view from above of the strainer plate in FIG. 6.

In the case illustrated in FIGS. 6 and 7, a debris catcher in the form of a strainer plate 40 is arranged above the bottom tie plate 11. The holes 41 in the strainer plate for the end plugs 33 at the lower part of the fuel rods 10 are larger than the cross section of the end plugs so that inner zones 42 with a lower relative flow resistance than in the rest of the strainer plate are present around the end plugs of the fuel rods. The strainer plate is also arranged with an edge zone 43 between the strainer plate and the casing part 1 with a lower relative flow resistance. Both in the inner zones 42 and in the edge zone 43, the strainer plate is provided with projections 44 and 45, respectively. Furthermore, the strainer plate is provided with punched-out smaller holes 46. The openings of the bottom tie plate for the cooling water are designated 47. The strainer plate may be secured to the fuel assembly, for example by being fixed to the bottom tie plate 11 with spacers and screws (not shown).

Figure 8:
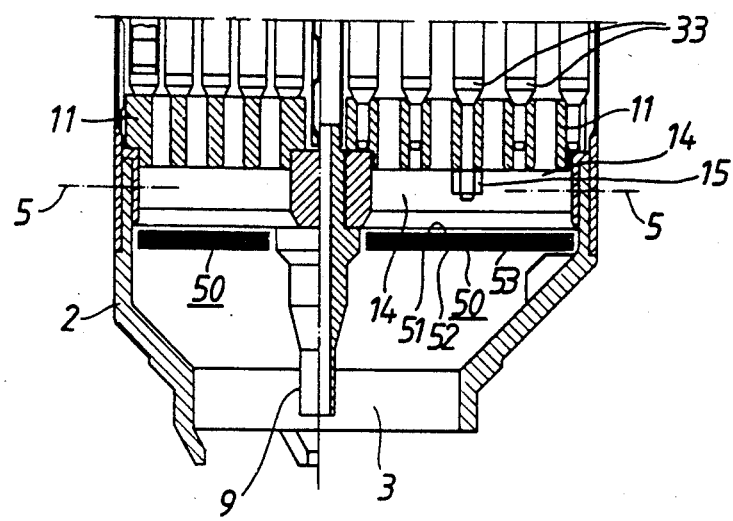
FIG. 8 is a vertical section of the lower part of a composed fuel assembly with a debris catcher in the form of a container, arranged below the bottom tie plate of each fuel assembly, with limiting walls with through-holes.

FIG. 8 shows the lower part of a composed fuel assembly. The upper part (not shown) is of the same kind as the upper part of the fuel assembly shown in FIG. 1. According to FIG. 8, each debris catcher comprises a container 50 which is arranged below the bottom tie plate 11 and which has limiting walls 51 and 52, parallel to the bottom tie plate and provided with through-holes (not shown), and contains a sparse stack of folded sheets 53. The holes in the limiting walls are sufficiently large and the stack of sheets sufficiently sparse for the container to provide a low flow resistance to the water while simultaneously providing a good capture effect.

Figure 9:
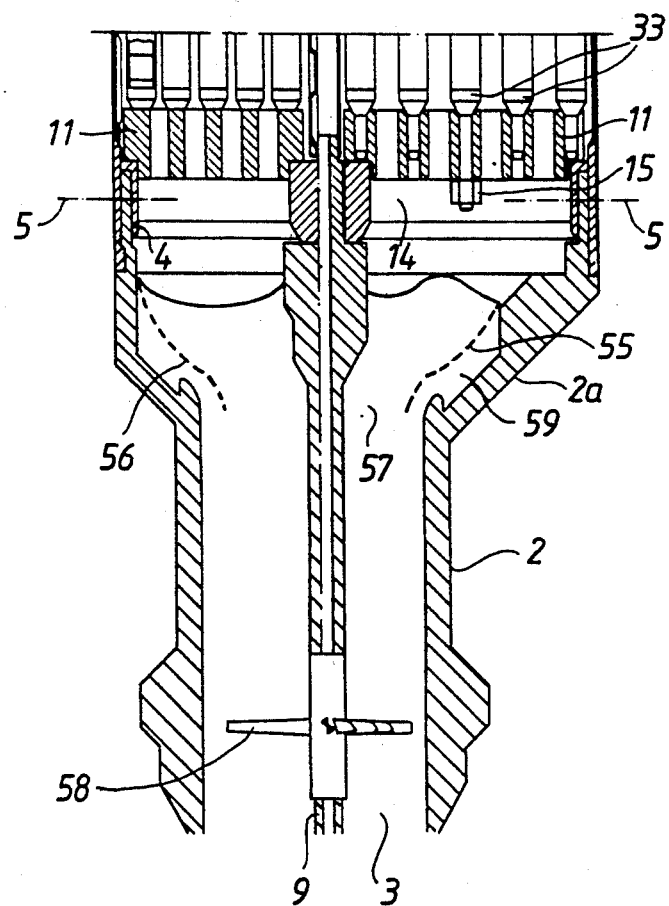
FIGS. 9 and 10 show the lower part of a composed fuel assembly composed of four fuel assemblies according to the invention with a debris catcher in the form of a funnel-shaped strainer plate which is common to the four fuel assemblies and a common system of conical sheet metal cones, respectively.

FIG. 9 shows the lower part of a composed fuel assembly. The upper part (not shown) is of the same kind as the upper part of the fuel assembly shown in FIG. 1. According to FIG. 9, the bottom part 2 is formed as a vertical tube with an upper conical portion 2a. The debris catcher comprises a funnel-shaped strainer, arranged in the conical portion 2a of the bottom part, in the form of a strainer plate 55 with the narrower part 56 of the funnel directed downwards and with an opening 57 in the narrower part which takes up a considerable part of the cross section of the tube 2. Guide vanes 58 for the water, to provide centrifugal effect, are provided in the tube to prevent debris from passing through the opening in the narrower part of the funnel-shaped strainer plate. A pocket 59 for accumulated debris is arranged in the conical portion 2a.

Figure 10:
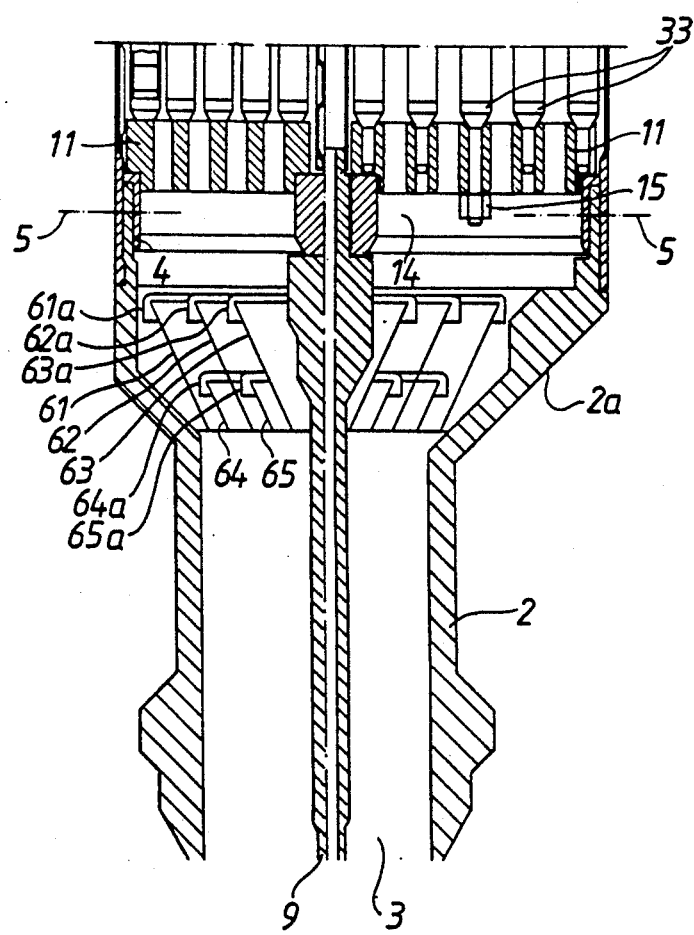

FIG. 10 also shows the lower part of a composed fuel assembly. The upper part (not shown) is of the same kind as the upper part of the fuel assembly shown in FIG. 1. Parts 2, 3 and 9 correspond to corresponding parts of the fuel assembly according to FIG. 9, and part 2a deviates only in that a pocket 59 is missing. The debris catcher comprises a number of concentric sheet metal cones 61-65, arranged in the conical portion 2a of the bottom part, which have alternately higher (61-63) and lower heights (64, 65). To catch debris, each cone has at its upper end an outwardly-directed, bent-down edge 61a-65a, which forms a narrow flow opening with adjacent sheet metal cones.

I claim:

1. A fuel assembly for a boiling water nuclear reactor which comprises:
   a bottom tie plate,
   a top tie plate,
   a bottom part which defines an inlet opening,
   a plurality of fuel rods which extend between said bottom tie plate and said top tie plate, each fuel rod having end plugs which respectively extend into said bottom tie plate and said top tie plate,
   a vertical casing which surrounds said bottom tie plate and said top tie plate and is connected to said bottom part, and
   a debris catcher with low flow resistance mounted in spaced relation with said bottom tie plate such that water flowing into said bottom part through said inlet opening will pass through said debris catcher for collection of debris prior to passing upwardly between said fuel rods within said vertical casing and through the said top plate.

2. A fuel assembly according to claim 1 wherein said debris catcher comprises a strainer which is parallel to the bottom tie plate.

3. A fuel assembly according to claim 2, wherein the strainer is shaped and dimensioned to provide an edge zone in the form of a gap between it and adjacent parts of the fuel assembly, and wherein the strainer is provided with projections extending into the edge zone.

4. A fuel assembly according to claim 2, wherein the strainer is located above the bottom tie plate, wherein the fuel rods include end plugs at lower ends thereof, wherein the strainer includes holes for said end plugs, said holes being larger than the cross section of the end plugs so that inner zones are present around the end plugs, and said strainer including projections which extend into the inner zones.

5. A fuel assembly according to claim 1 wherein the debris catcher comprises a container which is arranged below the bottom tie plate and which has limiting walls parallel to the bottom tie plates and provided with through-holes, and which comprises a sparse stack of folded sheets.

6. A composed fuel assembly comprising four fuel assemblies according to claim 9 arranged around a central common channel for water and wherein the bottom part is formed as a vertical tube with an upper conical portion which is connected to the outwardly-facing bottom positions of the casing parts of the fuel assemblies, wherein the debris catcher comprises a funnel-shaped strainer arranged in the conical portion of the bottom part, the narrower part of the funnel being directed downwards.

7. A composed assembly according to claim 6, wherein the strainer is formed with an opening in the narrower part which takes up a considerable part of the cross section of the tube and guide vanes for the water for centrifugal effect are provided in the tube to prevent debris from passing through the opening in the narrower part of the funnel-shaped strainer.

8. A composed fuel assembly comprising four fuel assemblies according to claim 9 arranged around a central channel for water and wherein the bottom part is formed as a vertical tube with an upper conical portion which is connected to the outwardly-directed bottom portions of the casing parts of the fuel assemblies and wherein the debris catcher comprises a number of concentric sheet metal cones arranged in the conical portion of the bottom part and provided at the upper end with an outwardly-directed bent-down edge.

9. A fuel assembly according to claim 1, wherein said debris catcher is positioned between said inlet opening and said bottom tie plate.

10. A fuel assembly according to claim 1, wherein said debris catcher is positioned between said bottom tie plate and said top tie plate.

11. A fuel assembly according to claim 1 including spacer means within said vertical casing and between said bottom and top tie plates for maintaining the positioning of said fuel rods relative to one another.

* * * * *